Nov. 8, 1938.                    J. RAE                    2,135,912
                    INTERNAL DIAMETER MICROMETER
                        Filed Aug. 20, 1936
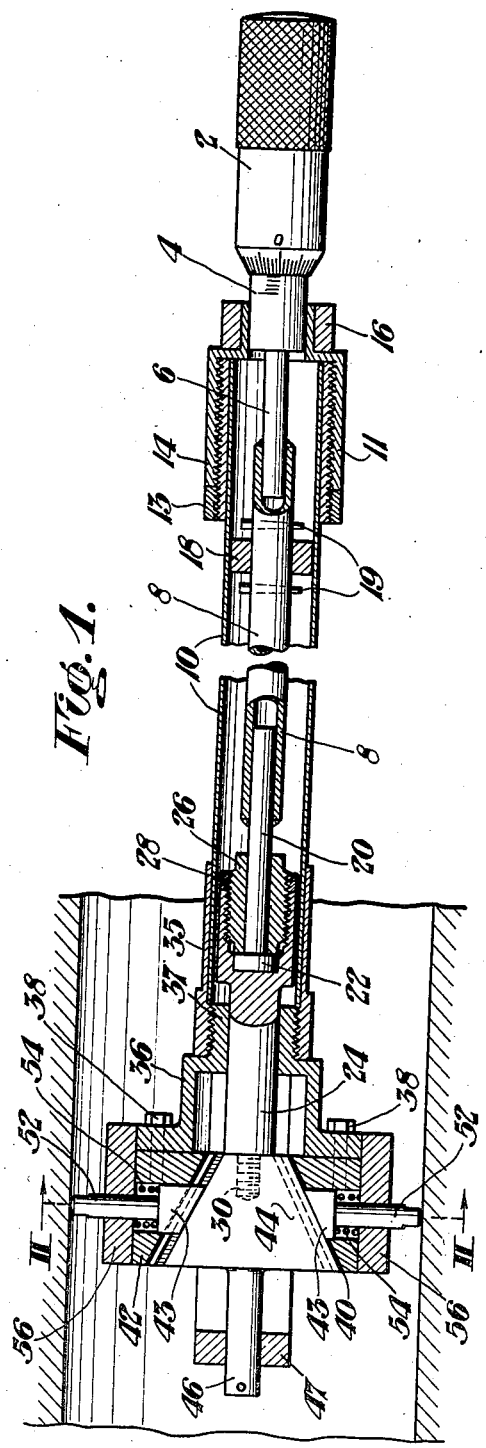
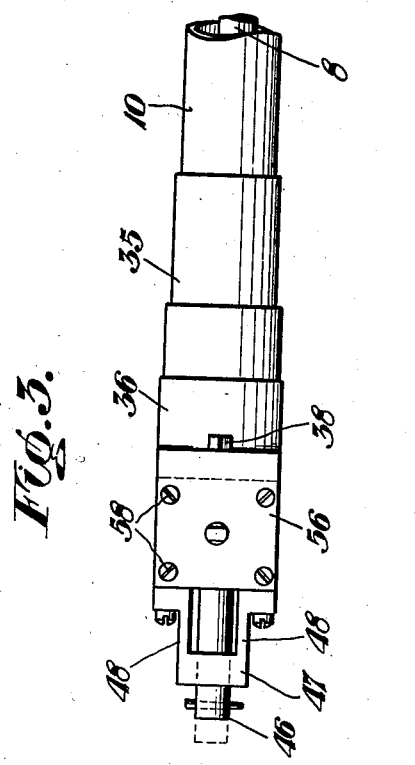
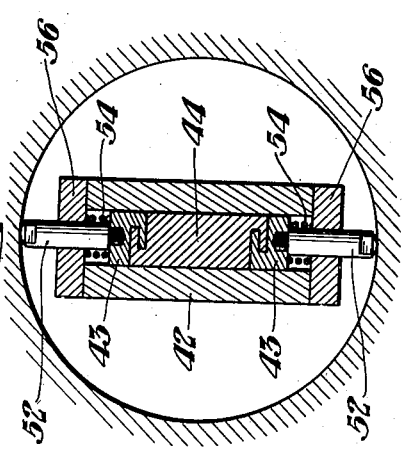
Inventor:
JOHN RAE,
by: Usina & Rauber
his Attorneys.

Patented Nov. 8, 1938

2,135,912

UNITED STATES PATENT OFFICE 2,135,912

INTERNAL DIAMETER MICROMETER

John Rae, Ellwood City, Pa., assignor to National Tube Company, a corporation of New Jersey Application August 20, 1936, Serial No. 97,056

7 Claims. (Cl. 33—164)

This invention relates to internal diameter micrometers and particularly to micrometers which are adapted to be used in various length and diameter tubing, cylinders or the like.

The present style internal diameter micrometer is not ordinarily adapted to be conveniently used in various length or diameter tubing, cylinders or the like.

The object of this invention is to provide an internal diameter micrometer which is sturdy, easily operated, positively acting, relatively inexpensive and adapted to be readily changed so that it can operate in tubing or the like of various sizes and lengths.

The above and other objects will be apparent from the following description and the accompanying drawing in which:

Figure 1 is an elevation, partly in section and broken in the center, of one embodiment of my invention.

Figure 2 is a section on line II—II of Figure 1.

Figure 3 is a plan of the gaging end of the embodiment of my invention shown in Figure 1.

Referring more particularly to the drawing, the numeral 2 designates the head of a micrometer which may be of any standard construction usual for inside micrometers and includes a body 4 and a spindle 6. The present micrometer is constructed for use in gaging long tubular objects and therefore the spindle 6 is extended by securing thereto by welding, or otherwise, an extension tube or shaft 8 and the body 4 is extended by securing thereto a tubular extension member or barrel 10. The barrel 10 is connected to the body 4 by means of a threaded bushing 11 which is secured to the barrel 10 at its body attaching end and the bushed end of the barrel is threaded into a barrel connecting sleeve 14 which in turn is secured to the body 4 by a clamp collar 16. The barrel 10 is locked in position by a nut 13 which is threaded on the bushed end of the barrel 10 and engages the end of the connecting sleeve 14.

The shaft 8 preferably is supplied with circular bearings 18 which are free on its circumference and spaced approximately two feet apart in actual construction. Means such as dowel pins 19 position the bearings 18 on the shaft 8. Due to the reduced scale of the present drawing only one of the bearings is shown. However it will be understood that any number necessary may be provided.

A spindle 20 having a pad 22 at one end is secured to the free end of the extension tube 8 by welding the two members together so that the motion of the pad 22 is identical with the motion of the spindle 6. In order to connect the pad 22 to a headstock 24 so as to give the headstock linear motion regardless of the motion of the pad 22, a threaded collar 26, free on the spindle 20, is threaded into the larger end of the headstock 24. The collar 26 and the headstock 24 snugly position the pad 22 between them so that the pad 22 can move helically or axially and the headstock 24 and collar 26 receive only the linear or axial component thereof. A lock nut 28 prevents the collar 26 from accidentally changing its position by engaging with the collar 26 and engaging the end of the headstock 24. The headstock 24 has a threaded projection 30 on its end opposite to that which receives the pad 22.

In order to give access to the tube 8, the barrel 10 can be freed from the barrel connector 14 and removed from the micrometer by sliding it over the headstock 24. In this manner the tube 8 is made readily accessible and, as it is connected to the micrometer head 2, they are detachable as a unit.

To connect the expansion means to the body of the micrometer, a sleeve 35 having a threaded bore is fixed to the circumference of the barrel 10 at its end and the threaded bore extends beyond the barrel 10. A rectangular cover 36 having an open top engages with the sleeve 35 by means of a hollow, externally threaded projection 37 on the base of the cover 36. The headstock 24 and projection 30 extend through a central opening in the cover 36. Secured to the cover 36 by any suitable means, such as screws 38, is an open ended box 42 having a tapered aperture 40 through two opposite sides thereof. The box 42 is provided with slides 43 having tapered bases adapted to move perpendicularly to the axis of the headstock 24.

In order to move the slides 43, they are mounted on the tapered sides of a wedge block 44 by means of a sliding interlock, as shown in Figure 2. The sliding interlock insures the required positive motion between the slides 43 and the wedge 44 although the desired result could be obtained by other means. To secure the wedge 44 to the headstock 24 a tapped recess in the wedge 44 engages with the projection 30 of the headstock 24. The wedge 44 is received in the aperture 40 of the box 42 in such a manner that its linear motion, which is supplied to it by the headstock 24, is not hindered. It will be understood that the wedge 44 receives the axial movement of the head 2.

The tapered sides of the wedge 44 preferably make an angle of 53 degrees, 8 minutes with each other and an angle of 26 degrees, 34 minutes with the axis of linear motion of the headstock 24 as the tangent of 26 degrees, 34 minutes is .5. Then, as there are two tapered sides on the wedge 44, the total vertical movement of the slides 43 equals the linear movement of the headstock 24 and the spindle 6, and a direct reading of the movement of the expansion means is secured at the micrometer head.

When assembling the apparatus the slides 43 should be placed in the box 42 and then the wedge 44 is slid into the aperture 40 so that the sliding interlock is obtained between the wedge 44 and the slides 43. After that the wedge 44 can be engaged with the projection 30 on the headstock 24, and the micrometer is assembled for operation.

A tailstock 46, integral with the wedge 44, extends out perpendicularly from the base of the wedge 44 and is positioned by a guide 47. The guide 47 snugly receives the tailstock 46 in an aperture through the body of the guide 47 and thereby aids in positioning the wedge 44. The guide 47 has arms 48 which are connected to the box 42 by screws or other suitable means.

Anvils 52, preferably having perfectly flat jaws perpendicular to the axis of the anvils 52, extend out of the box 42 and are removably secured to the slides 43. It will be appreciated that the jaws are necessarily diametrically opposite one another in relation to the axis of the headstock 26 and also that the jaws are parallel to each other. Of course, the micrometer can be used in vertical or horizontal positions as its motion is positively controlled. The anvils 52 are readily removable and by changing the length of the anvils 52 to suit the diameter of the tube to be measured nearly any given tube can be measured by this micrometer. Springs 54 are placed around the anvils 52 and are compressed slightly by rectangular plates 56 which serve as end covers for the box 42. The springs 54 are of sufficient strength that they bear upon the slides 43 and aid them in following the movement of the wedge 44. The plates 56 are removably secured to the box 42 by screws 58.

In operation, the micrometer head 2 is rotated by which the pad 22 is made to bear upon the headstock 24, or the collar 26, depending upon the direction of movement of the head 2, and to move the wedge 44 axially in accordance with the predescribed action. When the wedge 44 is moved axially the positions of the slides 43 are accordingly changed, and the distance between the jaws of the anvils 52 is thereby directly controlled. The distance between the jaws at a zero reading of the micrometer is known so that the entire inside diameter measurement is determined from the micrometer reading. Due to the fact that the anvils 52 can readily be changed, the movement of the micrometer spindle 6 can be limited to a maximum value, such as a quarter of an inch, if desired, but the micrometer can still measure tubes varying widely in inside diameter.

It will be appreciated that the scope of the invention is not limited to the specific form illustrated and described, but is actually defined by the appended claims.

I claim:

1. An inside diameter micrometer comprising a standard micrometer including a head, a body and a spindle, an extension tube secured to said spindle, a barrel removably connected to said body, bearings positioned on said tube, a spindle having a pad at one end secured to the free end of said tube, a threaded collar free on said spindle, a cylindrical headstock receiving the pad of said spindle and engaging with said collar whereby axial motion only is transmitted to said headstock from said spindle, a rectangular cover connected to the free end of said barrel, a box having open ends and a tapered aperture through two opposite sides removably connected to said cover, slides snugly received in said box and limited to motion in a plane perpendicular to the axis of said headstock, a wedge block which is rectangular in cross-section and trapezoidal in longitudinal section having its tapered sides at an angle of 53 degrees, 8 minutes with each other received in said aperture in said box and mounting said slides by means of a sliding interlock, said wedge being removably secured to said headstock, a tailstock integral with said wedge extending out perpendicularly from the base of said wedge, a guide positioning said tailstock removably secured to said box, anvils removably secured to said slides, springs positioned around said anvils, and end covers which force said springs against said slides, said end covers covering the end of said box and being removably secured thereto.

2. An inside diameter micrometer comprising a standard micrometer including a head, a body and a spindle, an extension tube secured to said spindle, a barrel removably connected to said body, bearings positioned on said tube, a spindle having a pad at one end secured to the free end of said tube, a threaded collar free on said spindle, a cylindrical headstock receiving the pad of said spindle and engaging with said collar whereby linear motion only is transmitted to said headstock from said spindle, a box having open ends and a tapered aperture through two opposite sides is removably connected to said barrel, slides snugly received in said box and limited to motion in a plane perpendicular to the axis of said headstock, a wedge block having its tapered sides at an angle of 53 degrees—8 minutes with each other received in said aperture in said box and mounting said slides by means of a sliding interlock, said wedge being removably secured to said headstock, a tailstock integral with said wedge extending out perpendicularly from the base of said wedge, a guide positioning said tailstock removably secured to said box, anvils removably secured to said slides, and end covers removably secured to said box.

3. An inside diameter micrometer comprising a standard micrometer including a head, a body and a spindle, a shaft connected to said spindle, a barrel connected to said body, a threaded collar free on said shaft, a cylindrical headstock receiving said shaft and engaging with said collar, a box having open ends and a tapered aperture through two opposite sides removably connected to said barrel, slides snugly received in said box and limited to move in a plane perpendicular to the axis of said headstock, a wedge block received in said aperture in said box mounting said slides by means of a sliding interlock said wedge being removably secured to said headstock, a tailstock integral with said wedge extending perpendicularly from the base of said wedge, a guide positioning said tailstock removably secured to said box, anvils removably secured to said slides, and end covers removably secured to said box.

4. An inside diameter micrometer comprising a standard micrometer including a head, a body and a spindle, a shaft connected to said spindle, a barrel connected to said body, a threaded collar free on said shaft, a headstock receiving said shaft and engaging with said collar, a box having open ends and a tapered aperture through two opposite sides removably connected to said barrel, slides snugly received in said box, a wedge block received in said aperature in said box for mounting said slides said wedge being removably secured to said headstock, a tailstock integral with said wedge extending out perpendicularly from the base of said wedge, a guide positioning said tailstock removably secured to said box, anvils associated with said slides, and end covers removably secured to said box.

5. The combination of a standard micrometer head including a spindle, a body and a head with extension means comprising an extension tube secured to said spindle, a barrel removably secured to said body, bearings positioned on said tube, a spindle having a pad at one end secured to the free end of said tube, a threaded collar free on said spindle, a cylindrical headstock receiving the pad of said spindle and engaging with said collar, and a member which is adapted to be secured to expansion means secured to said barrel.

6. Expansion means for an internal diameter micrometer comprising a box having a tapered aperture through two opposite sides, slides snugly received in said box, a wedge block which is rectangular in cross-section and trapezoidal in longitudinal section received in said aperture and mounting said slides by means of a sliding interlock, a tailstock integral with said wedge extending out perpendicularly from the base of said wedge, a guide positioning said tailstock secured to said box, anvils removably secured to said slides, and end covers removably secured to said box.

7. An internal diameter micrometer comprising a standard micrometer including a spindle, a body and a head, an extension tube secured at one end to said spindle and provided with a pad at the opposite end thereof, a threaded collar free on said extension tube, a headstock receiving said pad and engaging with said collar, a barrel extending the length of said extension tube removably connected to said body, positioning means secured to the end of said barrel, and means engaged with said headstock and received in said positioning means, said last named means being constructed and arranged to produce a movement radially from and controlled by said headstock.

JOHN RAE.